Nov. 8, 1955  J. L. MERRIAM  2,723,070
MECHANISM FOR FILLING TANKS
Filed June 1, 1953

JOHN L. MERRIAM
INVENTOR.

BY Hazard & Miller

ATTORNEYS

United States Patent Office 2,723,070
Patented Nov. 8, 1955

2,723,070
MECHANISM FOR FILLING TANKS
John L. Merriam, Riverside, Calif.

Application June 1, 1953, Serial No. 358,601

5 Claims. (Cl. 226—109)

This invention has to do with an attachment for gasoline hoses or other devices wherein volatile materials are conveyed through the hose to a tank or container.

There is at the present time conditions that prevail about petroleum installations, such as gasoline stations, that present hazards not only to the workmen and attendants but also to consumers and incidental personnel. This hazard is caused by vapors escaping uncontrollably from the petroleum into the atmosphere and about the installation. Precautions have been adopted in the nature of using rubber or plastic hoses to eliminate sparks that could possibly occur, and, additionally, prominent "No Smoking" signs have been displayed in an effort to eliminate the hazard from tobacco sparks and the like. Although these precautions do result in a reduction of damage both to installation and personnel, it has not proved to be completely satisfactory. In connection with this, it has been determined in certain localities of the country that escaping petroleum vapors partially cause what is known as a "smog."

Therefore, the principal object of this invention is to provide a hose attachment to be applied to petroleum and gasoline hoses that will control escaping petroleum vapors and will retrieve the same, preventing the escape of, such as a volatile material into the atmosphere.

Another object of this invention is to provide a hose attachment that will retrieve volatile petroleum vapors resulting in reduction of hazards and "smog," making the surrounding area relatively free of danger and physical irritation.

A yet further object of this invention is to provide a hose attachment whereby petroleum vapors may be retrieved and their use by virtue of condensation or other applicable methods may be made available.

Figure 1:
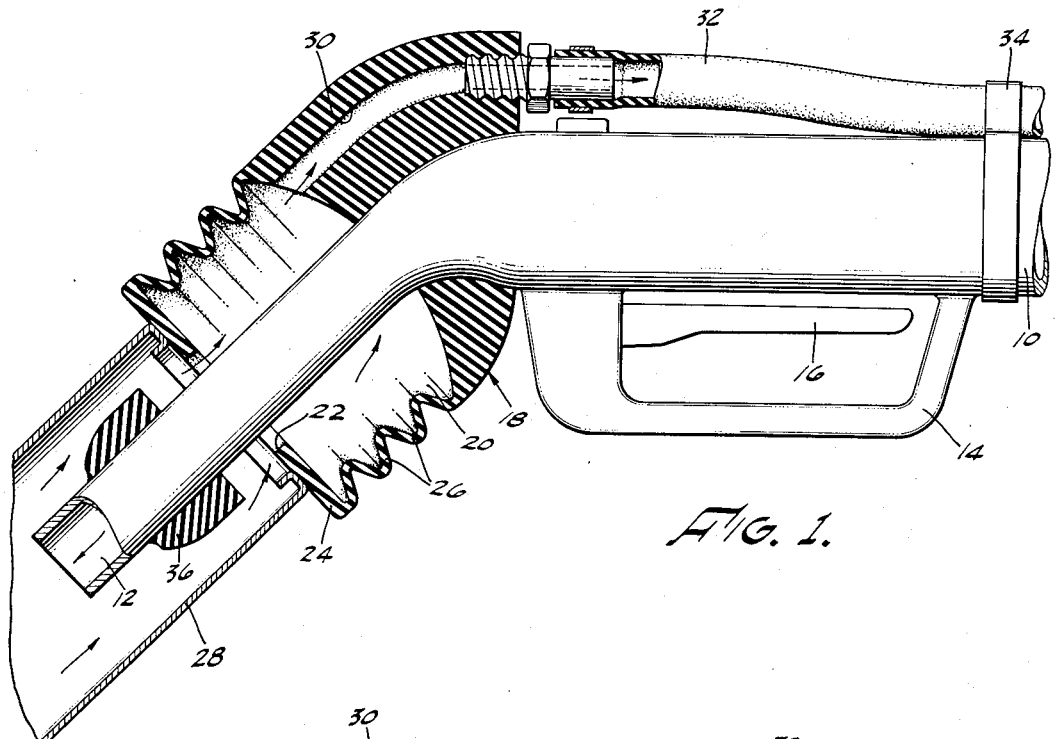
Figure 2:
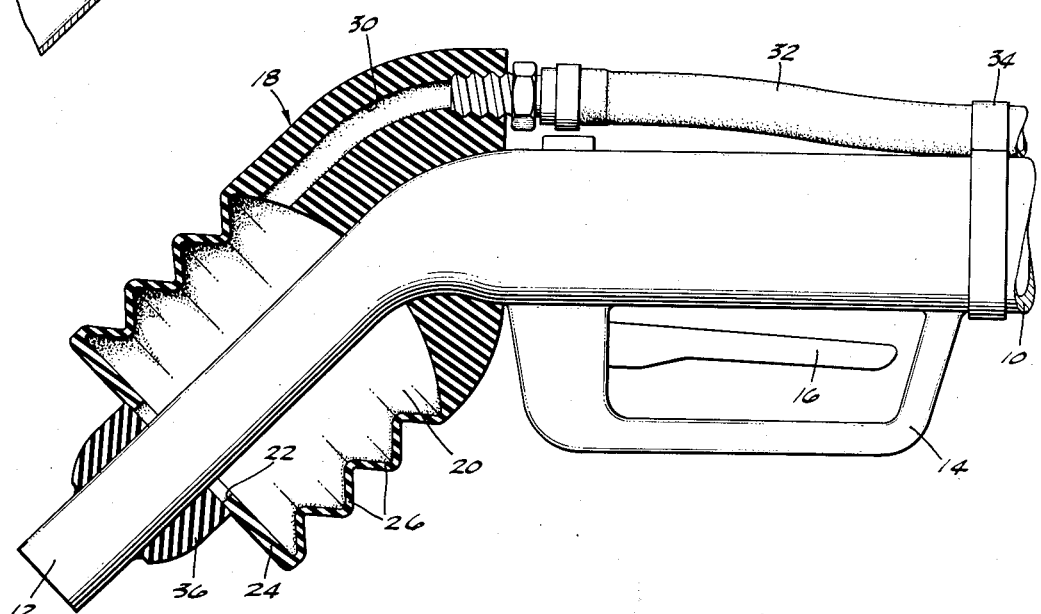

With the foregoing and other objects in view, which will be made manifest in the following detailed description and specifically pointed out in the appended claims, reference is had to the accompanying drawings for an illustrative embodiment of the invention, wherein:

Figure 1 is a cross-sectional view illustrating the device of this invention as applied to a gasoline filler pipe of an automobile; and Fig. 2 is a cross-sectional view illustrating the device of this invention wherein the attachment is free of the automobile filler pipe and temporarily not in use.

Referring to the accompanying drawings wherein similar reference characters designate similar parts throughout, 10 indicates a gasoline hose having a nozzle 12 integral therewith, and a handle 14 secured thereto. Handle 14 has disposed therewithin a valve actuating trigger 16 that opens and closes a valve within hose 10.

Removably secured to the nozzle 12 is a resilient body broadly designated by 18. Body 18 provides a vapor receiving chamber 20 which is in communication with an opening 22, the latter being defined by an annular flange 24. The walls of body 18 about chamber 20 have a number of accordion-like pleats 26 therein that results, when the device is placed in use as illustrated in Figure 1, in urging the flange 24 against the free end of the filler pipe 28 to cause a vapor tight seal to be formed therebetween. The body 18 and all of its integral and related parts are composed of a petroleum resistant material, such as synthetic rubber, plastic, or the like.

In communication with chamber 20 and formed in one side of body 18 is an arcuate channel 30 that has threaded therein a conduit 32, the latter leading to a vapor receiving container. The container may be the one from which the petroleum was conveyed to the gasoline tank of the automobile or it may be a separate and distinct vapor retriever.

Placed about hose 10 and conduit 32 in order to secure the latter firmly to the former is a band 34. Adjacent the free end of the nozzle 12 is a resilient seat 36 that has for its purpose the closing of opening 22 when the hose and attachment is free of the automobile filler pipe. Seat 36 is formed of the same material as body 18.

In operation, when gasoline is placed in an automobile gasoline tank via gasoline hose 10 and filler pipe 28, by virtue of actuating a trigger 16 to open a valve in hose 10, a positive pressure is applied to the petroleum vapors in the tank, urging the latter outwardly of the filler pipe and into the atmosphere. With this device, the annular flange 24 of body 18 is brought to bear against the free end of the filler pipe 28 to cause a vapor tight seal to be formed therebetween. The positive pressure exerted by the inwardly flowing petroleum against the vapors causes the latter to pass through opening 22 in body 18, into chamber 20 through arcuate channel 30, and ultimately into conduit 32 whereby the vapors are returned to a container.

In the event that the positive pressure is not sufficiently great to urge the vapors into the container, a small vacuum pump may be located therewithin whereby a negative pressure or vacuum may be placed on conduit 32 to draw the vapors into the aforementioned container.

When the gasoline hose 10 and body 18 are removed from the filler pipe 28, the accordion-like pleats 26 urge the annular flange 24 into contacting relationship with seat 36, the latter being about the nozzle 12. The seating of annular flange 24 upon the seat 36 prevents air from passing into chamber 20 and ultimately the container to mix with the retrieved petroleum vapors. When the gasoline hose and body 18 is again placed in use, annular flange 24 contacts the free end of filler pipe 28 and continual inward urging of nozzle 12 unseats annular flange 24 from seat 36, placing the chamber 20, arcuate channel 30 and conduit 32 in communication with the filler pipe 28 whereby vapors may again pass into a vapor receiving container.

Various changes may be made in the details of construction without departing from the spirit and scope of the invention as defined by the appended claims.

I claim:

1. A mechanism for filling tanks having filler pipes with liquids and retrieving vapors emanating from the tank comprising a hose and nozzle therefor, a resilient body attached to said hose having a portion adapted to bear against the filler pipe of said tank, said body having a vapor-receiving chamber therein in communication with said tank, resilient, accordion-like pleats in said body for urging said portion into contacting relationship with the filler pipe, a conduit, and a channel in said body in communication with said conduit and said chamber for conveying vapors to a container.

2. A mechanism for filling tanks having filler pipes with liquids and retrieving vapors emanating from the tank comprising a hose and nozzle therefor, a resilient body attached to said hose having a portion adapted to bear against the filler pipe of said tank, said body having a vapor-receiving chamber therein in communication with said tank, resilient, accordion-like pleats in said body for urging said portion into contacting relationship with the filler pipe, a conduit, a channel in said body in communication with said conduit and said chamber for conveying vapors to a container, and means on the nozzle for shutting off communication between said chamber and the interior of the tank.

3. A mechanism for filling tanks having filler pipes with liquids and retrieving vapors emanating from the tank comprising a hose and nozzle therefor, a body attached to said hose having a portion which is hollow, said body having an opening in one end thereof, a flange on said body defining said opening, said flange being adapted to contact the filler pipe to form a vapor-tight seal therewith, a conduit in communication with the hollow portion of the body for conveying vapors to a container, and a closure attached to said nozzle adapted to close said opening when the mechanism is not in contact with a filler pipe.

4. A mechanism for filling tanks having filler pipes with liquids and retrieving vapors emanating from the tank comprising a resilient body applicable to a hose and nozzle therefor by which the tank is adapted to be filled, said body having an opening in one end thereof, a resilient flange on said body defining said opening, said flange being adapted to contact the filler pipe of the tank to form a vapor-tight seal therewith, a conduit, resilient, accordion-like pleats in said body for urging said flange into engagement with the filler pipe, and a channel in said body connecting the interior thereof with said conduit for conveying vapors to a container.

5. A mechanism for filling tanks with liquids through filler pipes thereof and retrieving gases from the tanks comprising a hose and nozzle having a body thereon providing in its interior a vapor-receiving chamber, said body presenting a resilient wall engageable with the end of the filler pipe to form a seal therewith about the nozzle, there being an opening in said wall arranged about the nozzle through which vapors in the tank may pass into the vapor-receiving chamber, means for conducting off the vapors from the vapor-receiving chamber, the vapor-receiving chamber having resilient side walls expandible axially of the nozzle, and a closure on the exterior of the nozzle normally engaged by said resilient wall due to the expansion of the side walls, said closure being capable of being carried by the nozzle into the filler pipe of the tank to disengage the resilient wall therefrom and thus open said opening.

References Cited in the file of this patent

UNITED STATES PATENTS

| | | |
|---|---|---|
| 1,712,470 | Pray | May 7, 1929 |
| 2,208,989 | Lewis | July 23, 1940 |
| 2,214,708 | Mayne et al. | Sept. 10, 1940 |